(12) United States Patent
Schmidt et al.

(10) Patent No.: US 12,264,041 B2
(45) Date of Patent: *Apr. 1, 2025

(54) ELEVATOR SYSTEM WITH LIDAR AND/OR RADAR SENSOR

(71) Applicant: OTIS ELEVATOR COMPANY, Farmington, CT (US)

(72) Inventors: Walter Thomas Schmidt, Marlborough, CT (US); Joseph V. Mantese, Ellington, CT (US); Goran Djuknic, New York, NY (US); Paul R. Braunwart, Hebron, CT (US); Enrico Manes, Feeding Hills, MA (US); Ziyou Xiong, Wethersfield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,719

(22) Filed: Jul. 20, 2023

(65) Prior Publication Data
US 2023/0356980 A1  Nov. 9, 2023

Related U.S. Application Data

(63) Continuation of application No. 16/058,613, filed on Aug. 8, 2018, now Pat. No. 11,745,983.

(51) Int. Cl.
*B66B 1/34* (2006.01)
*B66B 1/24* (2006.01)
(Continued)

(52) U.S. Cl.
CPC ........... *B66B 13/26* (2013.01); *B66B 1/2408* (2013.01); *B66B 5/0012* (2013.01);
(Continued)

(58) Field of Classification Search
CPC ........... B66B 13/14–146; B66B 13/26; B66B 5/00–0037; B66B 1/3407–3423; B66B 1/3446; B66B 1/3453; B66B 1/3476
See application file for complete search history.

(56) References Cited

U.S. PATENT DOCUMENTS

| 4,506,765 A | 3/1985 | Payne et al. |
| 5,001,557 A | 3/1991 | Begle |

(Continued)

FOREIGN PATENT DOCUMENTS

| CN | 103663068 A | 3/2014 |
| CN | 203612783 U | 5/2014 |

(Continued)

OTHER PUBLICATIONS

European Search Report Issued in European Application No. 19190861.5-1017 dated Dec. 17, 2019; 6 Pages.

(Continued)

*Primary Examiner* — Christopher Uhlir
(74) *Attorney, Agent, or Firm* — CANTOR COLBURN LLP

(57) ABSTRACT

Disclosed is an elevator system having an elevator entryway, the elevator entryway including: a first door, which is an elevator door, a first controller operationally connected to the first door for opening and closing the first door to provide access to an elevator, wherein when the first door is closing: the first controller monitors for first instructions over a frequency applicable to light detection and ranging (LIDAR) and/or a radio detection and ranging (RADAR), and upon receiving the first instructions, the first controller executes the first instructions.

6 Claims, 3 Drawing Sheets

(51) Int. Cl.
*B66B 5/00* (2006.01)
*B66B 13/14* (2006.01)
*B66B 13/26* (2006.01)
*G01S 17/88* (2006.01)

(52) U.S. Cl.
CPC ............ *B66B 13/146* (2013.01); *G01S 17/88* (2013.01); *B66B 1/3461* (2013.01)

(56) References Cited

U.S. PATENT DOCUMENTS

| | | | |
|---|---|---|---|
| 5,493,812 | A | 2/1996 | Teich |
| 6,973,998 | B2 | 12/2005 | Deplazes et al. |
| 7,044,271 | B2 | 5/2006 | De Coi |
| 7,165,655 | B2 | 1/2007 | Cook et al. |
| 8,051,954 | B2 | 11/2011 | Pustelniak |
| 8,256,581 | B2 | 9/2012 | Nowel |
| 11,745,983 | B2 * | 9/2023 | Schmidt ................ B66B 1/2408 187/317 |
| 2007/0272493 | A1 | 11/2007 | Legez |
| 2016/0289042 | A1 | 10/2016 | Fang et al. |
| 2016/0289044 | A1 | 10/2016 | Hsu et al. |
| 2016/0292522 | A1 | 10/2016 | Chen et al. |
| 2016/0295196 | A1 | 10/2016 | Finn et al. |
| 2017/0100609 | A1 | 4/2017 | Hsu et al. |
| 2017/0264890 | A1 | 9/2017 | Gorilovsky et al. |
| 2020/0048048 | A1 | 2/2020 | Schmidt et al. |

FOREIGN PATENT DOCUMENTS

| | | |
|---|---|---|
| CN | 104340826 A | 2/2015 |
| CN | 105668392 A | 6/2016 |
| CN | 205397808 U | 7/2016 |
| CN | 106144862 A | 11/2016 |
| CN | 106946109 A | 7/2017 |
| CN | 106986253 A | 7/2017 |
| CN | 206318588 U | 7/2017 |
| CN | 107393204 A | 11/2017 |
| CN | 206783071 U | 12/2017 |
| JP | 0243195 A | 2/1990 |
| JP | 09303042 A | 11/1997 |
| WO | 2008013515 A2 | 1/2008 |

OTHER PUBLICATIONS

Scotti et al.; "Dual Use Architecture for Innovative Lidar and Free Space Optical Communications"; Allied Optics; vol. 56, No. 31; Oct. 31, 2017; 5 Pages.

* cited by examiner

ELEVATOR SYSTEM WITH LIDAR AND/OR RADAR SENSOR

CROSS-REFERENCE TO RELATED APPLICATIONS

This application is a continuation of U.S. patent application Ser. No. 16/058,613 filed Aug. 8, 2018, the disclosure of which is incorporated herein by reference in its entirety.

BACKGROUND

The embodiments herein relate to elevator systems and more specifically to elevator systems with light detection and ranging (LIDAR) sensors and/or radio detection and ranging (RADAR) sensors.

Passenger vertical lift systems (elevators, lifts, and the like) may be equipped with an obstacle detection system. Such systems may include light curtains, radar sensing, acoustic and ultrasonic interrogation, and camera systems spanning from visible to long wavelength infrared.

Obstacle detection systems may work well when the obstacle is in a vertical plane defined by a door frame. Detection normal to the door opening, however, may be a challenge because motion may be out of a plane of detection and sensors detect activity based upon receiving reflected energy from an acoustic, optical or electromagnetic transmitted energy source. Unwanted reopening of an elevator door may occur due to stray signals from reflections of persons in a vicinity of an elevator door even though there may be no intent to enter the elevator. This may lead to a relatively high false alarm rate (FAR). Conversely, improper settings or poor detector system discriminations may lead to injuries due to undetected obstacles. Consequently, alternative means of obstacle detection both in and out of plane are sought having lower FAR and fewer missed detections.

BRIEF SUMMARY

Disclosed is an elevator system comprising an elevator entryway, the elevator entryway including: a first door, which is an elevator door, a first controller operationally connected to the first door for opening and closing the first door to provide access to an elevator, wherein when the first door is closing: the first controller monitors for first instructions over a frequency applicable to light detection and ranging (LIDAR) and/or a radio detection and ranging (RADAR), and upon receiving the first instructions, the first controller executes the first instructions.

In addition to one or more of the above disclosed features and elements, or as an alternate, the first instructions include reopening or closing the first door.

In addition to one or more of the above disclosed features and elements, or as an alternate, the first instructions include closing the first door.

In addition to one or more of the above disclosed features and elements, or as an alternate, the system comprises a first sensor operationally connected to the entryway, the first sensor being a (LIDAR) sensor and/or a radio detection and ranging (RADAR) sensor.

In addition to one or more of the above disclosed features and elements, or as an alternate, the first sensor monitors the entryway and transmits instructions to reopen upon sensing motion into and/or out of the entryway and otherwise transmits instructions to close.

In addition to one or more of the above disclosed features and elements, or as an alternate, the first sensor is capable of continuously monitoring the entryway.

In addition to one or more of the above disclosed features and elements, or as an alternate, the system comprises a plurality of sensor including the first sensor and a second sensor, the first sensor being a LIDAR sensor and the second sensor being a RADAR sensor.

In addition to one or more of the above disclosed features and elements, or as an alternate, the first controller monitors for first instructions over a plurality of frequencies, including a frequency applicable to LIDAR and frequency applicable to RADAR.

In addition to one or more of the above disclosed features and elements, or as an alternate, upon receiving conflicting instructions from the plurality of sensors the first controller reopens the first door.

In addition to one or more of the above disclosed features and elements, or as an alternate, the plurality of sensors are operationally disposed in one or more of an entryway frame and an entryway landing.

Further disclosed is a method of monitoring an elevator entryway in an elevator system, the elevator system and entryway including one or more of the above disclosed features and elements.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
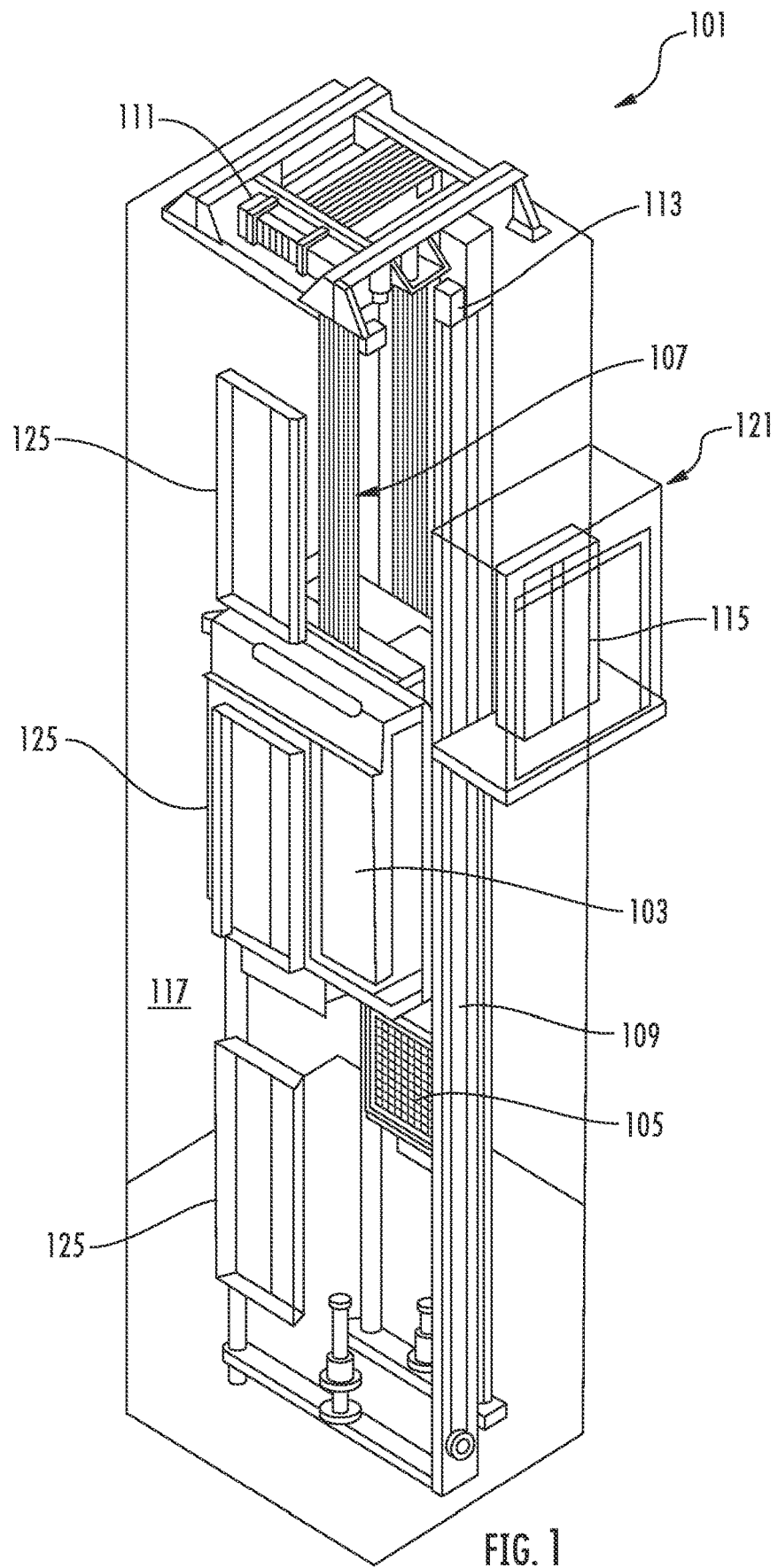
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

LIDAR systems are active ranging systems based upon time-of-flight of light to and from an obstacle. Similarly, RADAR systems are active ranging systems based upon time-of-flight of radio waves to and from an obstacle. They may both be routinely utilized as detection inputs for autonomous driving systems. These systems may improve autonomous detection by permitting the detection system to scan for obstacles in the vertical, horizontal, forward, and backward. Using LIDAR, detailed 3D maps of a region may enable a relatively higher level of object discrimination, and thus may provide a lower FAR and fewer missed detections. These systems (formed using free space optics) may be relatively large, draw relatively considerable power, may be relatively difficult to install, and may be costly.

Photonic integrated circuits (PICs) may be utilized in safety systems where superior target discrimination in 3D may lead to enhanced system performance and fidelity. A LIDAR system-on-a-chip may be used for modest bandwidth communication via binary bit transfer (Frequency Modulation, FM), and/or light intensity variation (Amplitude Modulation, AM). LIDAR may therefore permit the incorporation of wireless communication capabilities in addition to local obstacle detection and discrimination. Thus, LIDAR may be utilized for landing door jamb protection sensors rather than cabling for multiple floors, which may make wiring such a system relatively difficult. A usage of LIDAR for wireless communications may enable relatively reduced wiring and relatively easy differentiation of sensor signals to the door controller to reverse or stop an elevator door.

Figure 2:
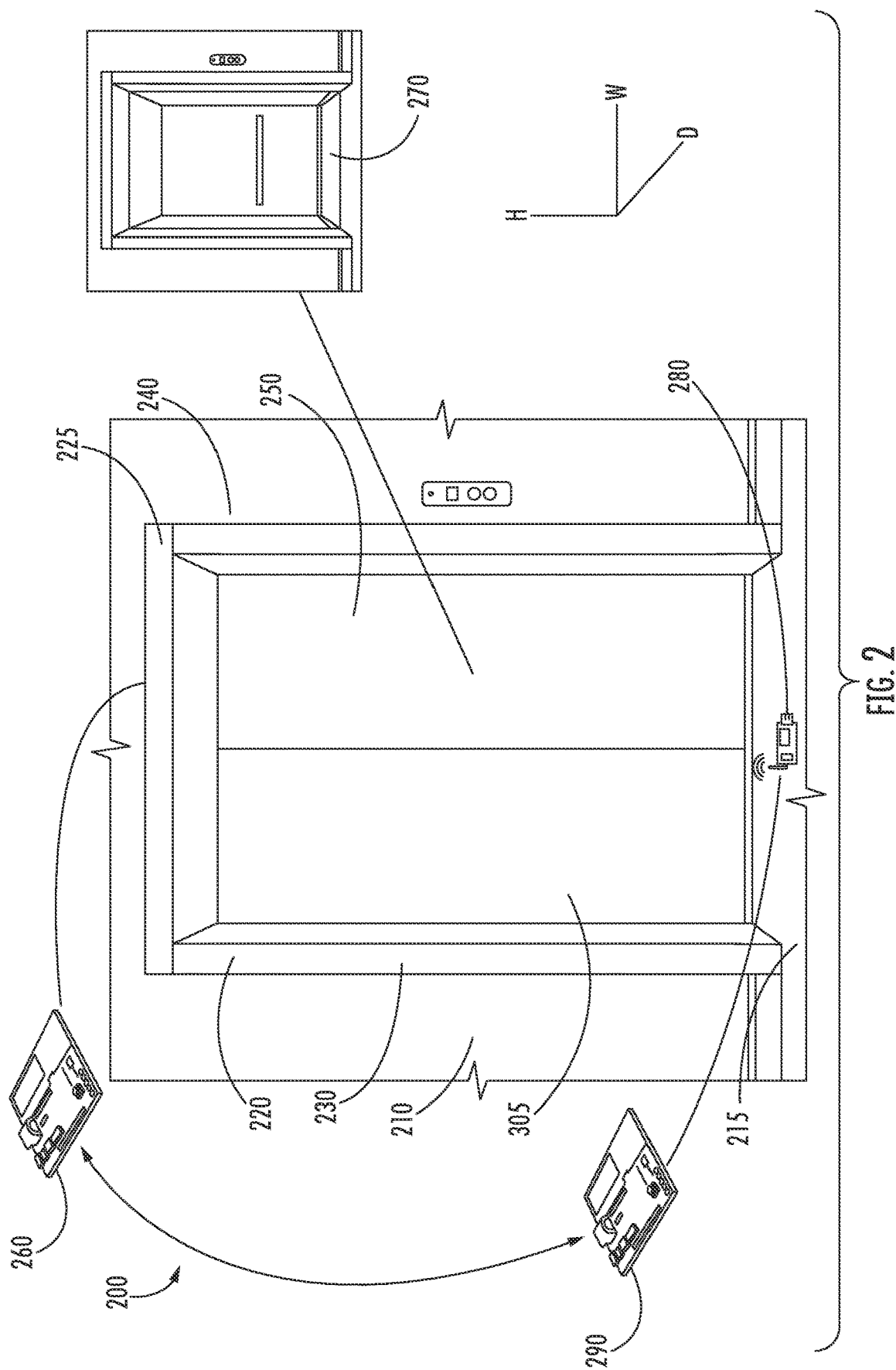
FIG. 2 illustrates features of a disclosed elevator system according to an embodiment.
Figure 3:
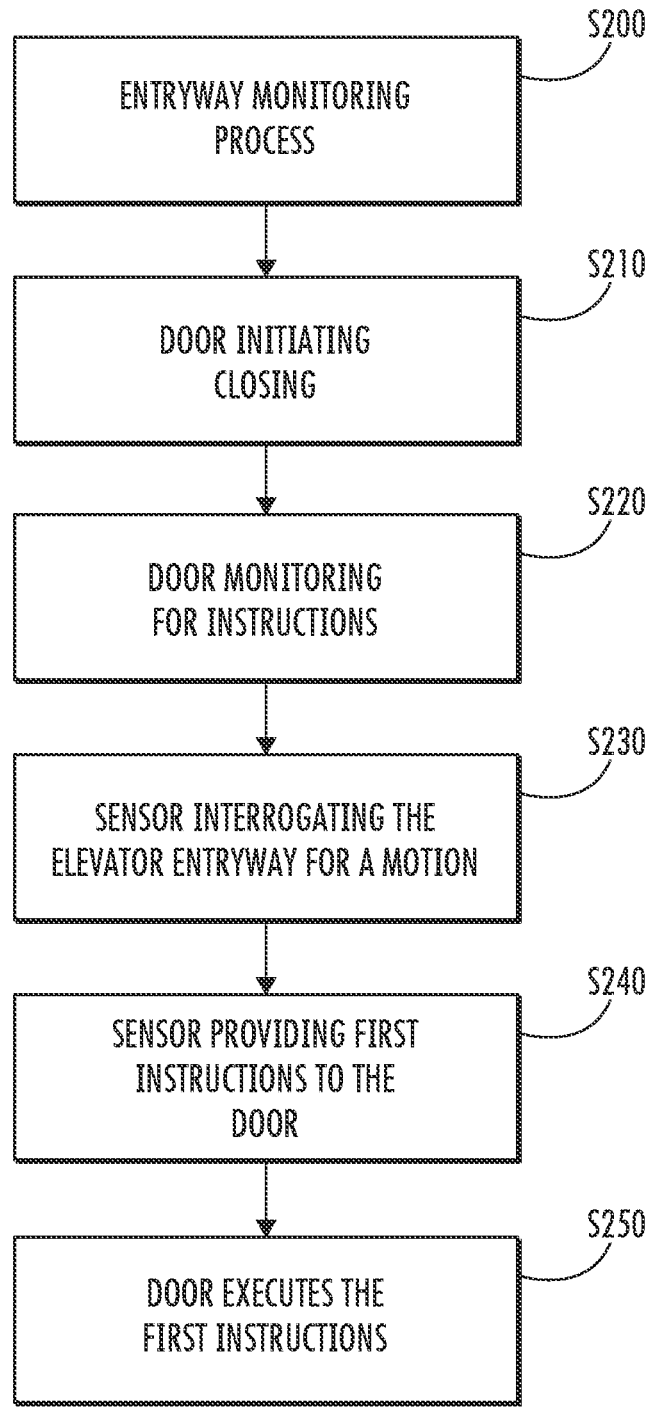
FIG. 3 illustrates a disclosed process for monitoring an elevator entryway according to an embodiment.

FIGS. 2-3 illustrate additional technical features associated with one or more disclosed embodiments. Features and elements disclosed in FIGS. having nomenclature that is the same or similar to that in FIG. 1 may be similarly construed even though numerical identifiers may differ.

FIG. 2 discloses an elevator system 200 comprising an elevator entryway 210 having a landing 215 and frame 220 with a top 225 spaced from the landing 215 in a height wise direction H. The frame 220 may include a plurality of sides including a first side 230 and a second side 240 mutually spaced in a widthwise direction W. The landing 215 may extend in a depth wise direction D away from the frame 220. Reference labels in this document such as "first" and "second" facilitate describing the disclosed embodiments and do not identify a priority or ordering of any features or elements unless expressly indicated.

The elevator entryway 210 may include a first mechanized door 250 and a first controller 260 operationally connected to the first door 250 for opening and closing the first door 250, providing access to an elevator car 270. Reference to the first door 250 herein may also be construed as reference to the first controller 260. Similarly, reference to other components herein controlled by respective controllers may also be construed as reference to the respective controllers.

A first sensor 280 may be operationally connected to the entryway 210, for example in the landing 215 or on or near the frame 220. The first sensor 280 is illustrated at the landing 215 though such illustration is not limiting. The first sensor 280 may be a light detection and ranging (LIDAR) sensor and/or a radio detection and ranging (RADAR) sensor. The first sensor 280 may comprise separate sensors, that is, a LIDAR sensor and a RADAR sensor. A second controller 290 may be operationally connected to the first sensor 280. According to an embodiment the first sensor 280 and the second controller 290 may comprise a unitary package, which may be relatively small and compact for placement around the entryway. According to an embodiment the system 200 may comprise a plurality of doors including the first door 250 and a second door 305. The plurality of doors may be center opening doors.

Turning to FIG. 3, an entryway monitoring process S200 is disclosed. Process steps are sequentially numbered in this document to facilitate discussion but are not intended to identify a specific sequence of preformation such steps or a requirement to perform such steps unless expressly indicated. The first door 250 may perform the step S210 of initiating closing. It is during this time when a potential injury could occur. The first door 250 may perform step S220 of monitoring for instructions over a frequency applicable to LIDAR and/or RADAR communications. The first sensor 280 may perform step S230 of interrogating the elevator entryway 210 to determine whether there is motion into or out of the entryway. When motion is detected, the first sensor 280 may perform step S240 of providing first instructions to the first door 250. At step S250 the first door 250 may execute the first instructions.

According to an embodiment the first instructions may be reopening the first door 250. This may occur when the sensor detects a potential hazard, such as movement around the entryway 210 interpreted as a person entering or exiting the elevator. According to an embodiment the first instructions may be to close 250. This may be the default instruction, enable the elevator door to normally close. According to an embodiment the first sensor 280 transmits the first instructions over the scanning interrogation frequency. By transmitting over this frequency, the need to utilize a telecommunications infrastructure is minimized.

The above embodiments disclose utilization of a light detection and ranging (LIDAR) sensor and/or a radio detection and ranging (RADAR) sensor, which may be negligibly sized, for obstacle detection, discrimination, and communication. In addition, the above embodiments may relate to the usage of LIDAR signals and/or RADAR signals a means of effecting wireless communications to a door controller to initiate reopening of an elevator door. Such communications may be advantageous for usage as detection systems where the sensors may be landing mounted or when additional wiring may be less desirable.

In addition to the above identified features and associated benefits, the disclosed embodiments may satisfy additional needs. Many door detection systems may be required to provide enhanced sensing capabilities. For example, systems may be required to sensing objects on a landing in addition to along a plane of the door. In addition LIDAR sensors and/or RADAR sensors in detection systems may be applicable for providing door jamb protection in door detection systems. Door jamb protection may be useful on both landing and elevator car doors. Positioning LIDAR sensors and/or RADAR sensors on each landing in a multi-landing facility is advantageous over a wired solution that may require cabling to a top of the hoistway from each floor, which may then be utilized for sending a signal to a door controller to halt a door opening motion.

Several issues may accompany a wired door jamb protection solution, which may be addressable by using a sensor as a communication device. Such a solution may result in a communication frequency a LIDAR sensor and/or a RADAR sensor uses to sense objects may also be utilized to send an open/close signal to the door controller. By using a LIDAR sensor and/or a RADAR sensor as a communication device, additional communication hardware may be avoided, which may reduce costs.

Another concern with wired solutions is where landing sensors are wired in series. An activation or issue with an upstream sensor may impact the ability to use downstream sensors. Having parallel wiring for each landing sensor, however, may be very difficult for installation in high rise buildings. It would also allow for wiring cost reduction.

On the other hand, elevator car mounted LIDAR sensors and/or RADAR sensors wirelessly communicating open/close commands to a door controller may save cabling costs and save space on a top of an elevator car. Wireless communication may be achieved through Wi-Fi though a benefit may be through using the LIDAR sensor and/or RADAR sensor itself as certain technologies may require additional technological investments to operate smoothly. For example Wi-Fi may require the creation of a system of routers, repeaters and access points on the sensor side as well as access points and receives within the elevator cab.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising an elevator entryway, the elevator entryway including:
    a door, and the entryway includes an entryway frame surrounding the door, and an entryway landing at the door;
    a controller operationally connected to the door for opening and closing the door to provide access to an elevator; and
    a plurality of sensors in a unitary package, including a first sensor and a second sensor, the first sensor being a light detection and ranging (LIDAR) sensor and the second sensor being a radio detection and ranging (RADAR) sensor, the plurality of sensors in the unitary package being disposed floor-level, at the entryway landing, near the entryway frame and adjacent to the door, wherein the controller and the plurality of sensors communicate with each other utilizing wireless communication protocols, wherein the plurality of sensors in the unitary package are both configured to monitor the entryway and transmit control instructions, wherein the control instructions are to reopen the door upon sensing motion into and/or out of the entryway, and otherwise the control instructions are to close the door, wherein the controller is configured to close the door, and during the closing of the door:

the controller monitors for the control instructions from the plurality of sensors in the unitary package over frequencies applicable to LIDAR and RADAR, and upon receiving the control instructions from the plurality of sensors in the unitary package, and the control instructions conflict with each other, the controller reopens the door.

2. The elevator system of claim 1, wherein the control instructions include closing the door.

3. The elevator system of claim 1, wherein the first sensor is capable of continuously monitoring the entryway.

4. A method of monitoring an elevator entryway in an elevator system, the elevator entryway including:

a door, and the entryway includes an entryway frame surrounding the door, and an entryway landing at the door;

a controller operationally connected to the door for opening and closing the door to provide access to an elevator; and a plurality of sensors in a unitary package, including a first sensor and a second sensor, the first sensor being a light detection and ranging (LIDAR) sensor and the second sensor being a radio detection and ranging (RADAR) sensor, the plurality of sensors in the unitary package being disposed floor-level, at the entryway landing, near the entryway frame and adjacent to the door, wherein the controller and the plurality of sensors communicate with each other utilizing wireless communication protocols, wherein the plurality of sensors in the unitary package are both configured to monitor the entryway and transmit control instructions, wherein the control instructions are to reopen the door upon sensing motion into and/or out of the entryway and otherwise the control instructions are to close the door, the controller is configured to close the door, and during the closing of the door, the method includes:

monitoring, by the controller, for the control instructions from the plurality of sensors in the unitary package over frequencies applicable to LIDAR and RADAR, and upon the controller receiving the control instructions from the plurality of sensors in the unitary package, and the control instructions conflict with each other, reopening the door.

5. The method of claim 4, wherein the control instructions include closing the door.

6. The method of claim 4, wherein the first sensor is capable of continuously monitoring the entryway.

\* \* \* \* \*